Jan. 22, 1935.  H. D. OPPENHEIMER  1,988,747
METHOD OF CONDITIONING ANIMAL CASINGS
Filed March 15, 1933
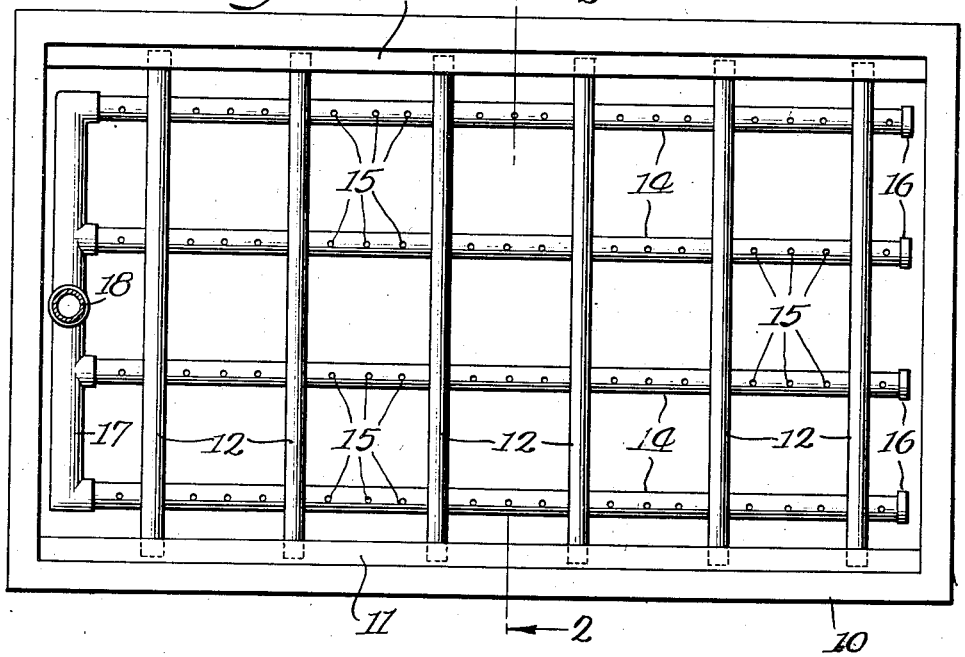
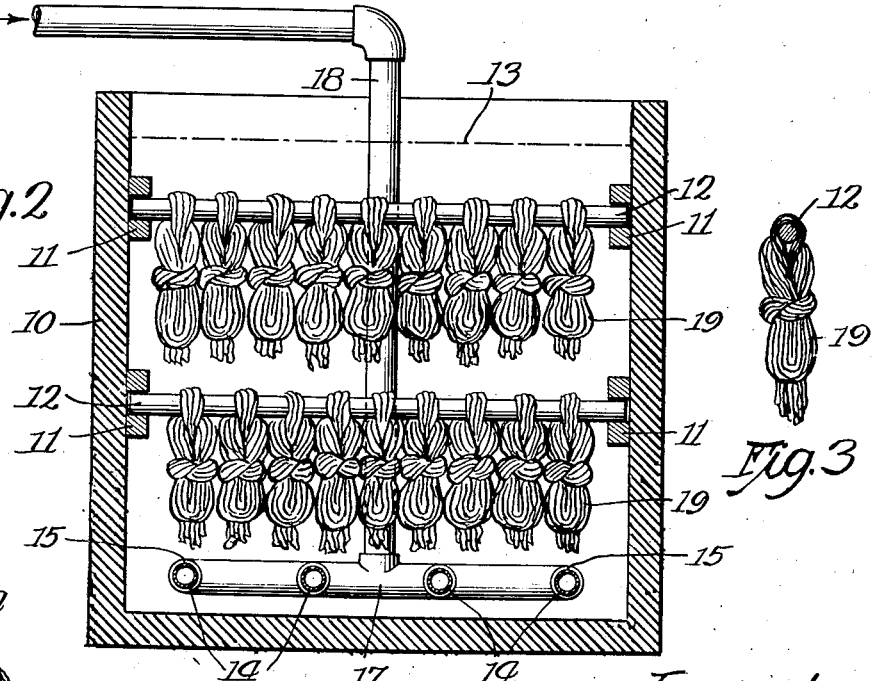
Inventor
Harry D. Oppenheimer Patented Jan. 22, 1935

1,988,747

UNITED STATES PATENT OFFICE 1,988,747

METHOD OF CONDITIONING ANIMAL CASINGS

Harry D. Oppenheimer, Chicago, Ill., assignor to Oppenheimer Casing Company, Chicago, Ill., a corporation of Illinois Application March 15, 1933, Serial No. 660,783

2 Claims. (Cl. 17—45)

My invention relates to a method for conditioning animal casings preparatory to subsequent processing as casings for sausages, bolognas and the like, and is more particularly concerned with the treatment of such casings for the purpose of complying with the regulations of the Federal Bureau of Animal Industry.

Where animals are slaughtered in countries, other than the United States, whose conditions of sanitation are either not well-known to or capable of verification by the Bureau of Animal Industry, the latter requires that casings produced under such conditions be processed upon arrival in the United States.

The characteristic method employed in the initial treatment of such casings is to immerse them in a dilute acid bath, followed by successive immersions in an alkaline bath such as a solution of sodium bicarbonate in order to neutralize the acid, and finally, an immersion in water in order to completely remove all traces of the alkaline solution. These several solutions are ordinarily contained in tanks and the casings are suspended therein and permitted to remain therein for a predetermined time.

It has been ascertained that the most desirable results are not secured by the above treatment and particularly does this condition obtain with respect to the complete removal and neutralization of the acid solution. If the latter is not thoroughly removed, the casing exhibits a tendency to become hard and generally unsatisfactory for sausage manufacturing.

It is therefore the principal object of my invention to devise a method wherein the casings, while immersed in each of the indicated baths, are subjected to the stirring, detergent and oxidizing action produced by gas bubbles passing through the bath, air, oxygen, oxidizing, or appropriate oxygenated gases being introduced under pressure at convenient locations in the bath and the bubbles being permitted to rise upwardly therethrough to accomplish the desired action.

A further object is to provide an apparatus for effecting the above method wherein a grid-like formation of pipes having a plurality of apertures for discharging the gas is disposed along the bottom of each tank, the precise arrangement of the pipes depending upon the conformation of the tank and the disposition of the casings therein.

These and further objects of my invention will be set forth in the following specification, reference being had to the accompanying drawing, and the novel means by which said objects are effectuated will be definitely pointed out in the claims.

In the drawing:

Figure 1 is a plan view of a tank for receiving one of the solutions in question, the mandrels which support the casings being shown in position and also one suggested arrangement of the air pipes.

Fig. 2 is a section along the line 2—2 in Fig. 1, looking in the direction of the arrows, and showing the mandrels supporting a plurality of casings which are segregated in a plurality of skeins.

Figs. 3 and 4 show two characteristic forms which the casings assume when undergoing this treatment, Fig. 3 showing the skein arrangement, while Fig. 4 shows a simple coiled disposition of the casings.

In carrying out my improved method, the same type of tank is used in applying each of the above noted solutions to the casings, so that in Figs. 1 and 2, for example, there is illustrated only a representative tank 10 which is preferably oblong in shape, but may possess other conformations if desired. At some convenient distance above the bottom of the tank, a pair of spaced rails 11 are secured to the opposite long sides thereof for the reception therebetween of a plurality of mandrels 12 which are utilized to support the casings hereinafter described. A second set of rails 11 may also be secured to the sides of the tank above those just described, after the manner generally indicated in Fig. 2. The disposition of the upper set of rails is such that when the tank is filled with one of the aforesaid solutions, the surface 13 thereof will be located above the uppermost mandrels in order to completely immerse the suspended casings.

The tank above described represents the current practice of the industry and, in order to improve its operative characteristics, I propose to introduce into the tank an arrangement for delivering gas under pressure to the solution whereby bubbles are caused to move upwardly therethrough for the purpose of agitating the same, the bubbles being ultimately freed to the atmosphere at the surface of the solution. The device for effecting this introduction of gas comprises, in the present instance, an arrangement of parallel pipes 14 located adjacent the floor of the tank. The upper side of each pipe is provided with a plurality of spaced apertures 15 located along the length of the pipe and one end of each pipe is closed by a cap 16. The opposite ends of the pipes are connected to a manifold 17 which is in turn joined to an inlet pipe 18 that rises upwardly out of the tank for connection with a suitable gas supply. Other pipe arrangements may be adapted as desired.

When the casings reach the plant for conditioning, they are generally in the form of skeins 19, or they may simply be collected in a plurality of coils 20. Each of these formations is simply a convenient method of handling in bunched form a large number of casings. The precise manner in which these casings are bunched does not affect the practice of my invention, but, for convenience, it will be assumed that the casings are collected in skeins.

The first step in the practice of the method consists in looping a plurality of skeins 19 onto the mandrels 12 and mounting the mandrels in a tank containing a germicidal solution. The appearance of the skeins are then as generally shown in Fig. 2, the skeins hanging downwardly from the mandrels and all of the skeins being completely immersed in the solution. The material used for this solution in the industry today is a dilute solution of hydrochloric acid.

One of the gases noted above is then introduced through the pipe 18 and its issuance from the apertures 15 produces bubbles which rise upwardly through the solution, causing its violent agitation and generally promoting the activity of the solution with respect to the casings. The nature of the disturbance caused by these bubbles can obviously be varied as desired by suitably changing the gas pressure and the size and shape of the apertures 15. It will be understood that the activation of the solution by the gas bubbles is generally assisted by the fact that the casing skeins do not hang from the mandrels after the manner of a dead weight, but owing to the fact that their specific gravity is only slightly greater than that of water, the skeins partially float in the solution and are weaved from side to side and also internally thereof by the motion created by the agitation of the solution. The soft and pliable nature of the casings assists this weaving action.

After being thus treated by the acid solution for a predetermined time, the mandrels and skeins are removed for insertion in a second tank, similarly arranged, but which contains an alkaline solution, such as a bath of sodium bicarbonate. The effect of the acid solution on the casing is somewhat harmful, since if not removed promptly therefrom, it causes the casings to become hard and to generally deteriorate, thus lessening their value as sausage casings. The alkaline solution completely neutralizes the acid traces which may cling to the skeins and, in connection with the generally oxidizing effect produced by the contact of the air bubbles with the casings, restores them to a soft and sweetened condition.

The final step in the method consists in a removal of the mandrels and skeins from the alkaline bath for treatment in a tank containing water and into which the gas is introduced in the general manner shown in Fig. 2. The purpose of this water treatment is to completely remove all traces of the alkaline solution and to further obtain the benefit arising from the sweetening of the casings by the oxidizing effect of the gas bubbles. After being thus treated for a predetermined time, the mandrels are removed and the skeins dumped into a barrel and covered with salt in order to maintain them in proper condition until subsequently processed for use as sausage casings.

The agitating of the several solutions by introducing gas thereinto affords a very convenient method for promoting the activities of the several solutions with respect to the casings and is distinctly superior to a form of agitation created by paddles or stirrers and the like. The utmost benefit of an agitation created by such instruments could not be obtained unless these devices were located relatively close to the casings, so that there would be danger of the casings becoming entangled with these stirring devices and destroyed. The gas bubbles provide an agitating and detergent action that is sufficiently violent for the purpose intended, but is also gentle enough not to tear or lacerate the fragile casings. The gas bubbles, finally, possess the important advantage of acting as an oxidizer, or as a carrier of oxygen, for the purpose of facilitating the action of the solutions and of sweetening the casings.

I claim:

1. The method of conditioning soft, animal casings for subsequent processing as sausage casings consisting in successively immersing bundles of the casings in dilute acid, alkaline and water baths, and agitating each bath by the passage therethrough of oxidizing or oxygen carrying gas bubbles to promote the activity of the respective baths relative to the casings, the alkaline and water baths substantially removing all traces of the acid and alkaline baths, respectively, and in conjunction with the gas bubbles maintaining and placing the casings in a soft and sweetened condition.

2. The method of conditioning soft, animal casings for subsequent processing as sausage casings consisting in suspending bundles of the casings successively in dilute acid, alkaline and water baths for predetermined times, and agitating each bath by introducing air under pressure in the bottom of each bath and permitting the oxidizing gas bubbles to rise indiscriminately between the casings to thereby promote the activity of the respective baths relative to the casings, the alkaline and water baths substantially removing all traces of the acid and alkaline baths, respectively, and in conjunction with the air bubbles maintaining and placing the casings in a soft and sweetened condition.

HARRY D. OPPENHEIMER.